United States Patent [19]

Miksitz

[11] Patent Number: 5,165,900

[45] Date of Patent: Nov. 24, 1992

[54] MOVING BED GAS/SOLIDS CONTACT APPARATUS

[75] Inventor: Frank J. Miksitz, Phillipsburg, N.J.

[73] Assignee: UFI, Inc., Phillipsburg, N.J.

[21] Appl. No.: 606,914

[22] Filed: Oct. 13, 1990

Related U.S. Application Data

[63] Continuation-in-part of Ser. No. 347,735, May 5, 1989, abandoned.

[51] Int. Cl.$^5$ ............................................. B01J 8/08
[52] U.S. Cl. .................................... 422/213; 422/219; 422/239; 55/77; 55/99; 55/474
[58] Field of Search ............... 422/216, 217, 219, 220, 422/239, 218, 213, 181, 192; 423/DIG. 16; 122/40; 431/7; 110/245; 34/57 A; 55/474, 99, 77

[56] References Cited

U.S. PATENT DOCUMENTS

| | | | |
|---|---|---|---|
| 4,035,170 | 7/1977 | Lear, Jr. et al. | 55/474 |
| 4,167,553 | 9/1979 | Persico et al. | 422/216 |
| 4,225,327 | 9/1980 | Sgaslik et al. | 55/474 |
| 4,254,557 | 3/1981 | Mayer et al. | 422/216 |
| 4,354,862 | 10/1982 | Sgaslik | 55/474 |
| 4,457,895 | 7/1984 | Prigent | 422/181 |
| 4,568,524 | 2/1986 | Pelrine | 422/218 |

Primary Examiner—Robert J. Warden
Assistant Examiner—Krisanne M. Thornton
Attorney, Agent, or Firm—Roylance, Abrams, Berdo & Goodman

[57] ABSTRACT

Gas/solids contact apparatus includes a tower-like, vertical vessel divided by internal wall structures into three axially-extending, concentric spaces. An inner space, typically of generally circular cross section and extending along the axis of the vessel, receives the gas which is to be contacted with particulate solids. An intermediate space, which may have a variety of configurations, surrounds the inner space and, during operation the contactor, contains a downwardly moving bed of solids. An outer space, typically of annular configuration, surrounds the intermediate space and serves to collect gas which flows from the inner space, generally horizontally through the moving bed of solids and then into the outer space for discharge through a gas outlet. In a preferred embodiment the moving bed of solids is contained by louvered walls, and these walls are constructed as modules which can be arranged to provide contactors having different gas and solids handling capacities.

6 Claims, 9 Drawing Sheets

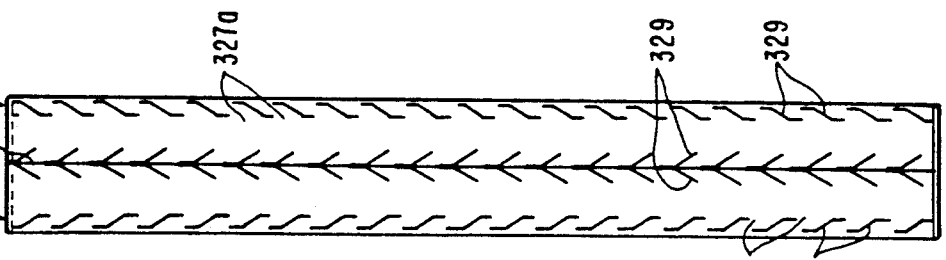
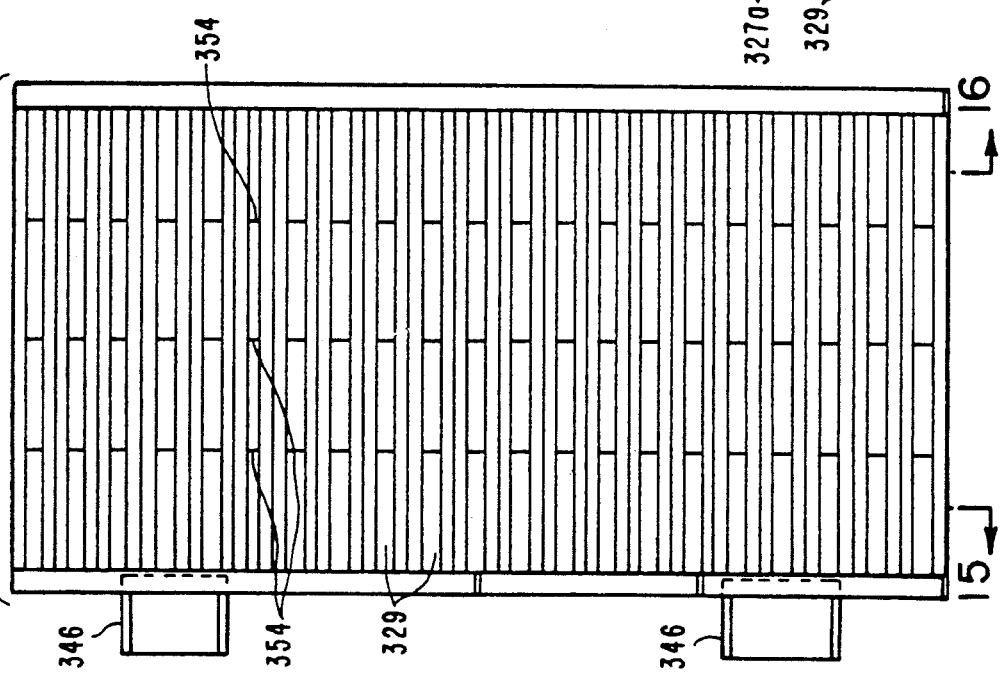
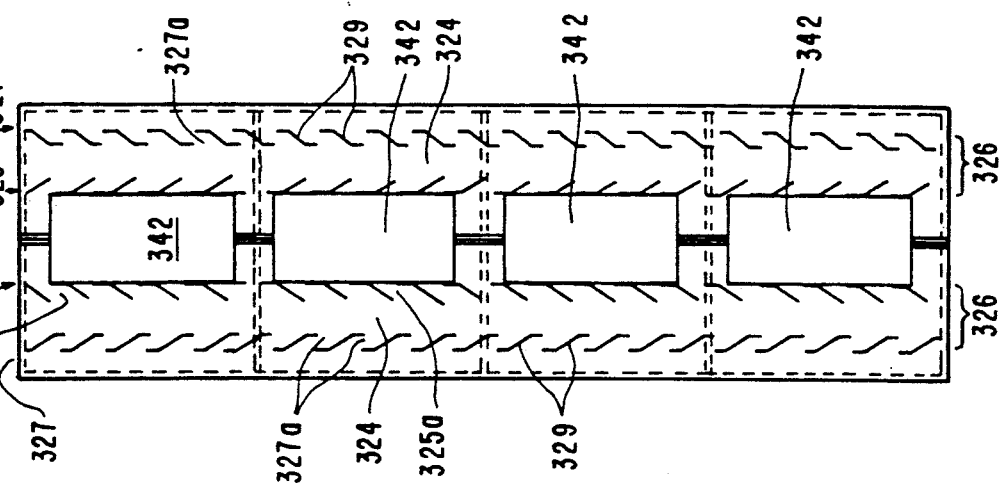

MOVING BED GAS/SOLIDS CONTACT APPARATUS

RELATED PATENT APPLICATION

This is a continuation-in-part of application Ser. No. 347,735 filed May 5, 1989.

FIELD OF THE INVENTION

This invention relates to gas/solids contact apparatus in which a gas stream intimately contacts a downwardly-moving bed of particulate solids and is discharged from the apparatus separately from the solids.

BACKGROUND AND SUMMARY OF THE INVENTION

Apparatus for contacting a gas stream with a bed of particulate solids has utility in a variety of chemical engineering operations, including filtering of solids suspended in the gas, cooling or heating the gas or the solids, adsorption or absorption of constituents of the gas by the solids, or removal of constituents of the solids by the gas or removal of constituents of the gas by the solids through chemical reaction between the two. Currently there is considerable interest in continuously operating gas/solids contactors in which a gas stream passes through a bed of particulate solids moving downwardly through a vertically-elongated, tower-like structure, the gas and the solids being discharged separately for further treatment or for disposal. For example, in the case of cleaning a gas stream by removing fine particulate matter therefrom, the gas containing the fine particles is passed through a downwardly moving bed of solid filter granules, such as gravel or ceramic granules, on which the fine particles are deposited and retained. The granules are discharged from the lower end of the apparatus separately from the cleaned gas and can be regenerated by washing and recycled to the upper portion of the apparatus.

The present invention is directed to an improved gas/solids contactor for carrying out any of the many chemical engineering operations referred to above. The invention has special utility in removing sulfur oxides and nitrogen oxides from fossil fuel flue gas by reaction between these oxide constituents of the flue gas and a solid sorbent in the form of a bed of appropriate sorbent particles moving downwardly through the tower.

In each of the several embodiments described hereinafter the interior of the tower-like vessel is divided by internal wall structures into three axially-extending, concentric spaces. An inner space, typically of circular cross section and extending along the axis of the tower, receives the gas which is to be contacted with the particulate solids. An intermediate space, typically of annular configuration surrounds the inner space and, during operation of the contactor, contains the downwardly moving bed of particulate solids. An outer space, typically annular in configuration, surrounds the intermediate space and serves to collect gas which flows from the inner space, through the bed of particulate solids and into said outer space, appropriate passageways through the internal wall structure being present to permit such gas flow. The gas in the outer space flows out of the contactor through a suitable discharge pipe, and the particulate solids are discharged from the lower end of the vessel.

The present invention is directed primarily to the internal structure of contactors of the kind referred to in the previous paragraph, such internal structure providing improved gas/solids contact while maintaining a low gas pressure drop across the contactor and maintaining controlled flow of solids through the contactor.

BRIEF DESCRIPTION OF THE DRAWINGS

In the drawings:

FIG. 14 is an elevational view of the gas/solids module of FIG. 13;

FIGS. 15 and 16 are schematic cross sectional views taken on the lines 15—15 and 16—16, respectively, of FIG. 14.

DETAILED DESCRIPTION OF THE INVENTION

Figure 1:
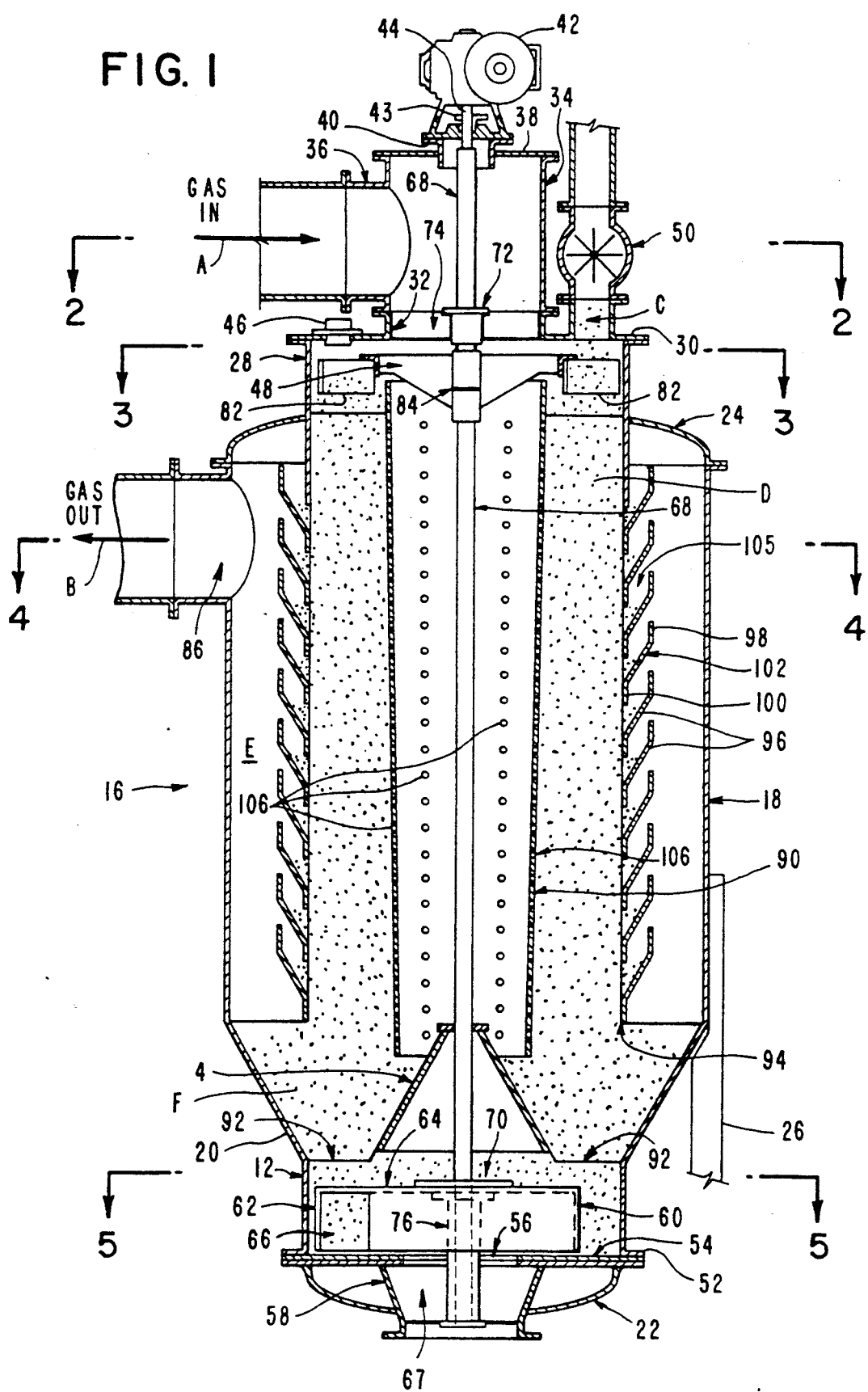
FIG. 1 is a vertical longitudinal sectional view of a first gas/solids contact apparatus embodying some of the principles of the present invention.
Figure 2:
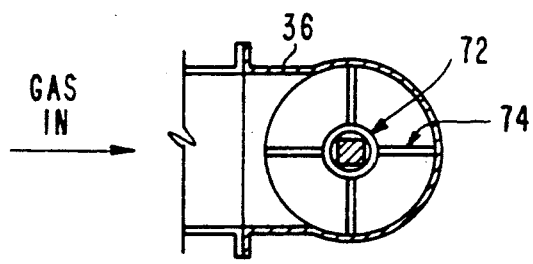
FIGS. 2, 3, 4 and 5 are transverse sectional views taken on the lines 2—2, 3—3, 4—4 and 5—5, respectively, of FIG. 1.

The apparatus of FIGS. 1-5 includes an upright cylindrical tower 16 which may be much like a hopper for particulate material in its mechanical design, e.g., it has an outer sidewall 18 which converges at 20, near the bottom. The tower 16 further includes a bottom wall 22 and a top wall 24. A plurality of legs 26 (like the one partly shown) may be sec·.red to the sidewall 18 and depend below the bottom end wall 22 for supporting the tower 16 on any stable foundation (not illustrated).

A dished top end wall 24 is intersected and penetrated by an upright tubular cylindrical body 28, itself having an upper end wall 30.

The upper end wall 30 is shown being distinct from the top end wall 24, but in a larger sense, each is a functional continuation of the other, and they could be structurally continuous to a greater degree than illustrated.

The upper end wall 30 is provided with a relatively large axially central opening 32 which is flanged so as to mount an upright tubular inlet plenum 34 which is horizontally intersected and penetrated by a gas inlet 36. The inlet plenum 34 is flanged at its upper end so as to mount a closure 38 having a flanged axially central opening 40. A drive with electric motor 42 for driving a particulate solids feeder (yet to be described) is mounted on the closure 38. Its rotary output shaft 44 projects down through the central opening 40 into the space confined by the inlet plenum 34.

The flanged opening 40 is provided with a rotary packing and gland 43 about the output shaft 44, so that the shaft 44 sealingly penetrates into the sealed space confined within the tower 16, yet is able to rotate.

The closure 38 is provided with a device 46 for determining the location of the upper level of particulates material of the down-moving bed in the tower 16. The device 46 may be as simple as a sight glass. However, it may be any convenient, known device which is suited to the purpose, e.g., a photoelectric cell which reflects a beam of light off the top of the bed of solids and produces an output signal indicative of the level of the bed. (Of course, such device would need to be time delay-operated so as to avoid obtaining a false reading due to light reflecting from a level-raking device 48, further described below).

The closure 38 is also provided with a particulate solids inlet device, such as a conventional rotary inlet valve 50 of the air lock type, through which particulate solid bed stock material may be introduced into the tower.

By preference, the level determining device 46 and level raking device 48 are located diametrically opposite one another and preferably at corresponding intermediate radial distances from the longitudinal axis of the tower 16. See FIG. 4.

The lower end of the sidewall of the tower is provided with an annular flange 52. A flat annual plate 54 which extends both inwardly and radially outwardly is bolted to flange 52 with countersunk bolts. This plate 54 contains the particulate bed material when the dished bottom wall enclosure 22 with all of its attached component parts is removed to service the white iron bearings contained in the housing 76. The bottom wall has a plate 56 which extends both radially outward to facilitate mounting the dished bottom end wall assembly to flange 52 and radially inwardly so as to provide a centrally ported horizontal shoulder for pipe 58 to which it is connected. The central port 56 feeds an upright downwardly tapering tubular outlet pipe 58, which extends downwards through the bottom end wall 22. It is through the outlet pipe 58 that spent particulate bed material, i.e. bed material which has participated in a gas-particulate solid contact operation with gas in the tower 16 and thereby has caused an effect on the gas and been affected by contact with the gas, leaves the tower 16.

Figure 5:
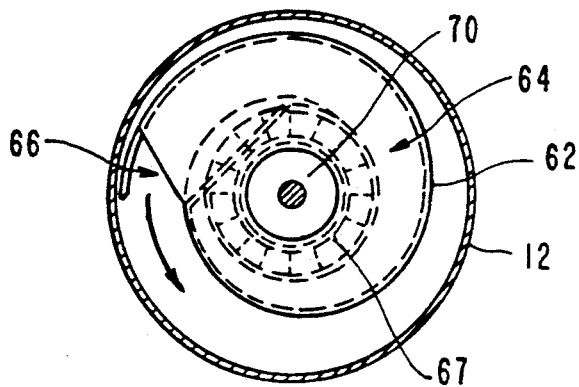

A variable-rate, particulate-solids feeding device 60, such as a spiral scoop feeder is located in the lower part of the tower 16, just above the centrally ported shoulder 54. It is unnecessary to describe a spiral scoop feeder in detail, because it may be of the type which is disclosed in the present inventor's U.S. Pat. Nos. 4,411,377 and 4,506,811. As shown in FIG. 5, the spiral scoop feeder 60 comprises a gently-curved spiral blade 62 set vertically on edge and dependingly connected to a roof plate 64 so as to provide a tangentially-opening entrance 66, and an axially centrally located, downwardly-opening outlet 67. As the device 60 is rotated about the longitudinal axis of the tower, particulate bed material falling into the space between the spiral blade and the sidewall 12 of the tower is engulfed by the advancing mouth 66, whereupon continued contact between inner and spiral turns of the blade increasingly centralizes the scooped-in particulate bed material. As the scooped-in particulate bed material is moved over the outlet 67 it becomes vertically unsupported and falls down the chute 58 and thus out of the tower.

If the particulate bed material leaving the tower 16 through the chute 58 is expendable, it may then be disposed of, but if it can be regenerated and reused, it may be sent through a regeneration system and recycled to the tower 16. If it is useful, it may be retained and used, or sold.

Figure 3:
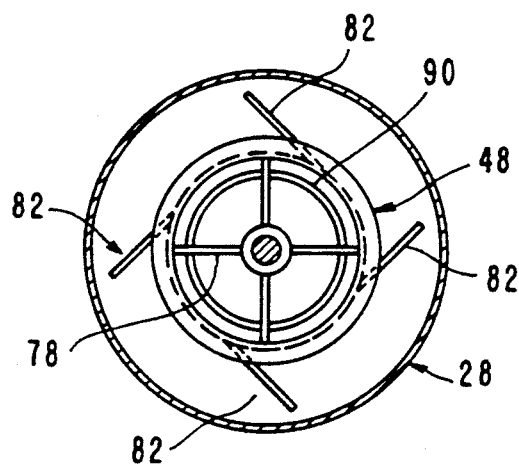
Figure 4:
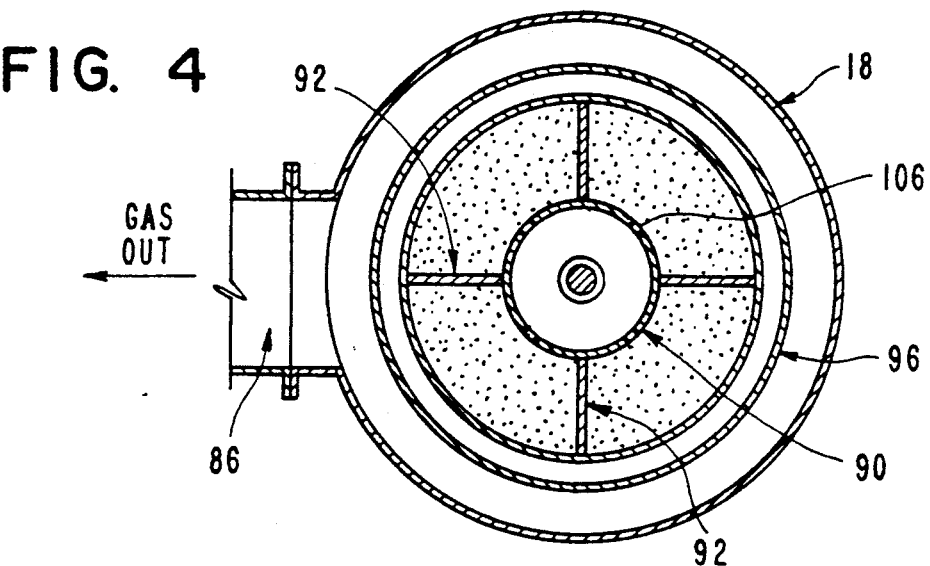

Mechanical (rotary) power for rotating the spiral scoop feeder 60 is provided by means of an axially centrally located pipe shaft 68 which is drivingly connected to the top wall (roof plate) 64 of the device 60, e.g., by means of a flange 70 welded on the pipe shaft 68 is shown axially receiving and being pinned to (and therefore drivingly connected with) the drive output shaft 44 of the drive with motor 42. Support bearings as shown in FIG. 3 which prevent undue wobbling of the shaft 68 are provided near its upper end at 72 (e.g., a white iron raking bearing mounted by a centralizing spider 74 to the lower end of the inlet plenum), and near its lower end at a pipe housing containing white iron bearings 76 (e.g., one at each end, mounted by a centralizing spider 78 to the chute 58, for which purpose a shaft 68 penetrates down through the roof plate 64 of the spiral scoop feeder and continues through pipe housing 76). By preference, the entire welded assembly composed of parts 22, 56, 58, 78 and 76 containing white iron bearings, one at each end, is one single unit, bolted to flange 52, with part 54 sandwiched between them.

The rake 48 is mounted to the pipe shaft 68 at 84 so as to be rotated thereby and has a set of downwardly directed scoop plates 82 disposed at a location which brings them directly under the site where the particulate bed material inlet valve opens into the upper end of the space within the tower confined by the tubular cylindrical body 28.

Even though the particulate bed material inlet valve may be offset from the central axis of the tower, provided the bed extends up high enough, the bed is generally evenly distributed circumferentially of the tubular cylindrical body by repeated rotation of the rake 48.

The outer sidewall 18 of the tower 16 is shown horizontally penetrated, preferably at its upper end, by a gas outlet pipe 86, the inner end of which terminates outside the tubular cylindrical body 28.

The tubular cylindrical body comprises a downwardly-extending radially outer tube 28, a radially inner tube 90 coaxial therewith, and a radiating spider-like set of three or more perforated longitudinal plates or webs 92 which connect the inner tube 90 with the outer tube 28, the latter being attached to the wall 24 for support.

The outer tube 28 is imperforate outside the top end wall of the tower, and also for a short distance below where it extends down through the top end wall 24 of the tower. The top of the radiating spider-like set of longitudinal perforated plates or webs 92 coincides with the top edge of top end wall 24 intersecting outer tube 28. The outer edge of each plate 92 is attached to the inside surface of side wall 28 for support and continues straight downwardly to the lower edge of sidewall 18 as well as horizontally to a point where sidewall 18 converges at 20. Subsequently it proceeds downwardly again along the slope of convergence 20 to which it is attached and until the lower edge of each plate 92 extends to a point where its edge will intersect the top side slope of a flow-promoting-cone 4 which is attached to and supported by the plate 92. From here each plate 92 is notched-out to follow-up along the outside diameter of the tapered perforated tube 90 and support it.

The outer edges of the plate 92 support a series of axially spaced, but nested downwardly tapering, axially short rings 102. Each of these rings 102 is shown having a radially outer, upper cylindrical flange 98 and a radially inner, lower cylindrical flange 100, the latter being connected to the outer edge of each plate. The upper edge of each upper flange 98 lies radially spaced from an intermediate location on a respectively next upper ring 102, and the lower edge of each inner flange 100 lies radially spaced from an intermediate location on a respectively next lower ring 102. Stated another way, the rings 102 each axially overlap their neighbors by about 30-50 percent, while leaving steeply upwardly-outwardly inclined, substantially circumferentially extending openings 105 of substantial path length from within the inner ring flanges 100 to without the outer rings flanges 98. The rings 102, in effect, form a port of the outer tube 28. Thus, these two structures, together with the inner tube 90, form an intermediate annular space which surrounds a central space defined by the inner 90. The outer tube 28, 102 also forms, with the tank sidewall 18, an outer annular space E surrounding the intermediate annular space. The central, intermediate and outer spaces are open at their lower ends and are thus in free communication with each other in this portion F of the tower 16. (Of course, at the lower end, there is no next lower ring, and at the upper extent of the series of rings 102, the lower end marginal portion of the imperforate part 28 of the outer tube is positioned in the series as if it were a lower ring flange 100).

The inner tube 90 is provided throughout its length and circumferential extent with an array of widely distributed small openings 106, e.g., the tube 90 is perforated.

By preference, the tube 90 slightly tapers downwardly, as shown.

The lower end of the inner tube 90 is spaced somewhat above the flow promotion cone 4. The plates 92 mount the inner tube 90 to the outer nested, downwardly tapering axially extending rings 96. The upper end of the inner tube 90 terminates just below the rotary rake 48 so as to avoid interfering with operation thereof. Therefore, the perforated tube 90 is suspended by the plates 92 from the tube 28, which is suspended from the upper end wall of the tower where the outer tube 28 penetrates the upper end wall of the tower.

Although some reinforced concrete can be used in large towers, preferably the smaller type tower 16 lends itself better to be fabricated out of metal plates and tubes suited to the duty of the structure, e.g., structural steel, the parts being connected by welding, bolting (as illustrated) or by other convenient means, with sealing rings, gaskets, glands, packing and the like being provided as one would expect in well-made apparatus for purposes such as that for which the apparatus of the present invention is intended.

In use, while the stream of gas to cause an effect or be affected flow in at A and, after affecting or being affected, flows out at B, particulate bed material is metered into the top end of the intermediate space between the inner and outer tubes 90, 28 at C, while the motor of the feeder 60 is controlled by a process sensor tied into a manually or servo-operated nullbalance system run (continuously, variably or intermittently) so as to maintain a down-moving bed of particulate bed material D having its upper end generally at or near the upper end of the inner tube 90 and its lower end resting on the roof plate 64 of the feeder 60 and partly on the flow promotion cone 4. The particulate bed material D naturally bridges the common space F in the tower.

Accordingly, in order to pass from within the inner tube 90, which is where the inlet plenum directs it, the incoming gas must pass through the bed of particulate material, either by passing out through the perforations 106 in the inner tube 90, through the bed, and up and out through the passageways 105 provided between the stacked rings 100 of the outer tube, thus into the radially outer substantially open annular space E between the outer tube and the sidewall 18 of the tower. Or, out through the perforations 106, down through the portion F of the bed that bridges the lower ends of the tubes, and up in the outer annular space E to the gas outlet.

If some particles of the particulate bed material should fall in through the perforations 106 in the inner tube 90, that is not a problem, since they can simply fall down to F, become part of the bridge, and eventually be swept out of the tower by operation of the rotary scoop feeder.

Likewise, if, despite the upward, outward pitch and length of the passageways 105 between the nested rings of the outer tube 96, some of the particles should be pushed up and out through them, that is not a problem, since they can simply fall down in the space E and become part of the bridge at F, and eventually be swept out of the tower by operation of the rotary scoop feeder.

The downward tapering of the perforated inner tube 90 helps to prevent hanging-up of the bed annularly between the inner and outer tubes, since the cross-sectional area available for the bed whereby increases in the downward direction.

When the apparatus 10 is used as a chemical reactor, e.g., exposing a sorbent to a gas stream to remove nitrogen oxides, sulfur oxides, hydrogen sulfide and/or the like, the maximum mass velocity of the gas at a given static pressure and temperature must be related to the speed of descent of the particulate bed, the bed depth, the surface area, percent of voids between particles, particles size and shape, and related variables (as will be understood by persons of ordinary skill in chemical engineering) in order to provide the desired collection efficiency of the constituent or constituents to be removed from the gas.

Of course, a plurality of the devices 10 can be used in series or in parallel.

The rate of rotation of the rotary scoop feeder 60 and/or the rate of introduction of particulate bed material at the top of the tower can be automatically controlled in response to a conventional feedback control system, e.g., by monitoring any of all of the inlet gas, the outlet gas, the inlet bed material, the outlet bed material and the height of the upper level of the bed in the tower.

Use of the rotary scoop feeder 60 gently jacks-down the bed of particulate material as though it were a continuous cone, disposed apex downwards, and through which the gas must flow to reach from the gas inlet to the gas outlet. No rotary air lock is generally needed at the bottom of the apparatus, since the apex portion of the bed, covering the rotary scoop feeder 60, provides a sufficient seal. Where necessary, an outlet valve could be provided.

Although the bed has been described as being a down-moving bed, it need not, of course, always be moving down, since, at times, depending on the gas flow rate, there can be pauses in the downward travel of the bed, i.e., the downward travel may be episodic.

Crushed stone or gravel is another example (from among many conventional packed tower materials which could be used) for the bed.

Figure 6:
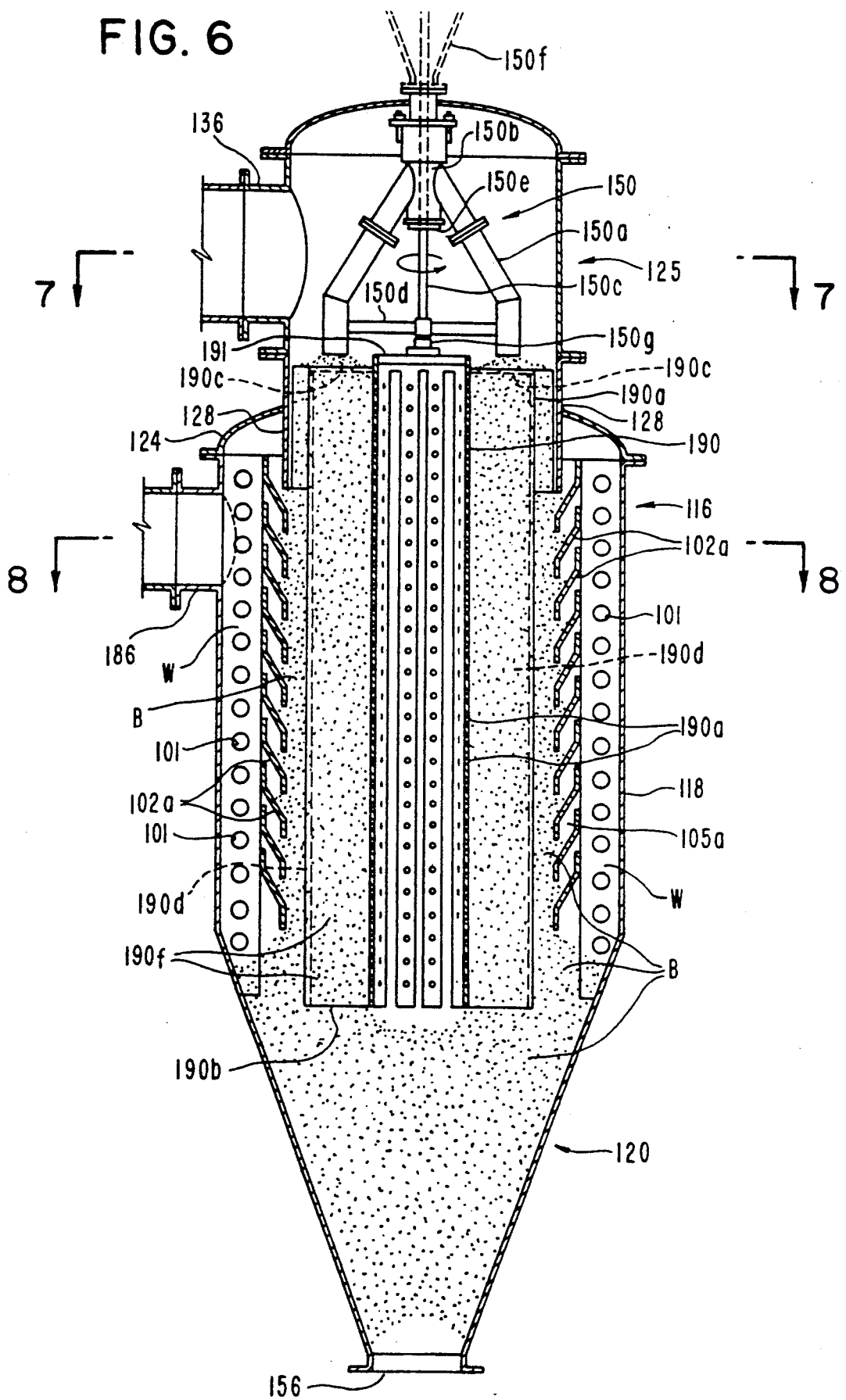
FIG. 6 is a vertical longitudinal sectional view of a second gas/solids contactor.
Figure 7:
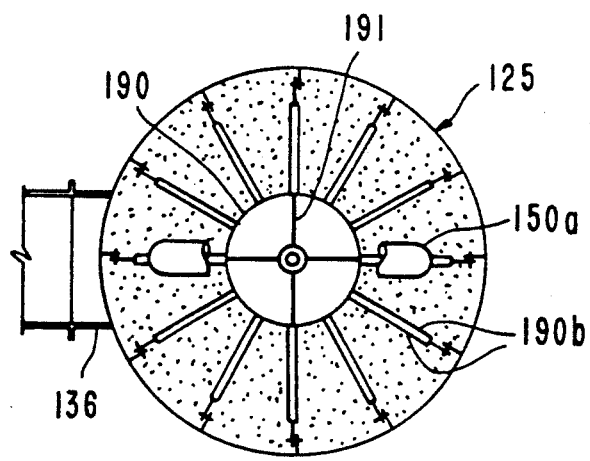
FIGS. 7 and 8 are transverse sectional views taken on the lines 7—7 and 8—8, respectively, of FIG. 6.
Figure 8:
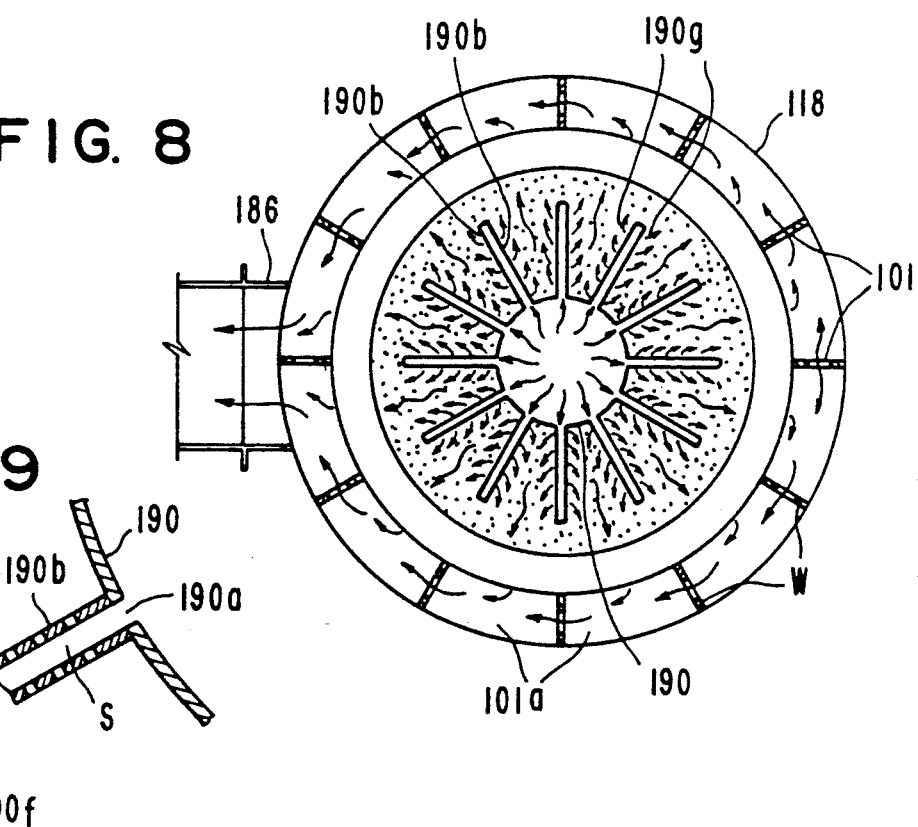

FIGS. 6, 7 and 8 illustrate a second gas/solids contactor which is a modification of the contactor shown in FIGS. 1–5 and which is intended primarily for use in filtering fine particles from a gas stream.

The FIGS. 6–8 embodiment comprises a tower-like vessel 116 having a circumferential sidewall 118 which converges at 120 near the bottom, forming a particulate-solids discharge opening 156. The opening connects with the inlet of a particulate-solids feeding device, not shown. The vessel 116 has a top end wall 124 through which a dome-like structure 125 extends, the structure 125 having a lower end portion 128 located within the upper portion of the vessel 116 and secured to the upper end wall 124. A gas inlet 136 connects with the dome 125, and within the latter is a particulate-solids feeder in the form of a rotary gravity pouring spout system 150. The feeding system includes a plurality of gravity-flow spouts 150a which are inclined downwardly and outwardly with respect to the longitudinal axis of the vessel 116, the spouts 150a having open lower ends and upper ends fixed to and in communication with the interior of a hollow cylinder 150b. The spouts 150a and the hollow cylinder 150b can be rotated about the axis of the vessel 116 by a driven vertical shaft 150c which is connected to the spouts 150a by a spider 150d and to a bottom closure plate 150e on the hollow cylinder 150d. The lower end of the shaft 150c resides in a bearing 150g. The shaft 150c extends upwardly through a particulate-solids bin 150f to a motor, not shown. The bin 150f is located outside the dome 125 and in operation of the apparatus will be kept full of particulate solids which flow downwardly into and through the spouts 150a while maintaining a gas seal.

Figure 9:
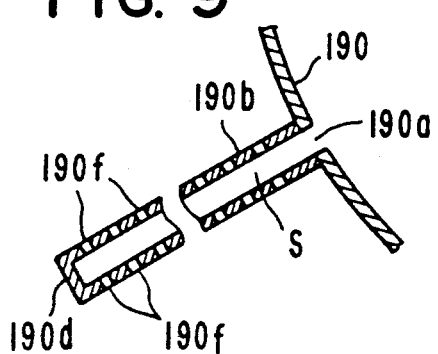
FIG. 9 is a fragmentary horizontal sectional view, on an enlarged scale, of a portion of the contactor of FIG. 6.

Inside the vessel 116 is an inner tube 190 which is concentric with the axis of the vessel 11 and which functions as a gas supply tube to a particulate bed B of solids which surrounds the inner tube 190 during operation of the apparatus. The lower end of the inner tube 190 is open, as is the upper end, except for a spider 191 which supports the bearing 150g. The wall of the inner tube 190 is perforated by a plurality of radial openings 190a which may be vertically elongated and which are arranged in vertical rows. The openings 190a in each row communicate with a space S (See FIG. 9) formed between a pair of spaced-apart perforated plates 190b which are arranged radially with respect to the inner tube 190 and which extend the length of the latter. The inner edges of the plates 190b are attached, as by welding, to the outer surface of the tube 190, the upper edges of each pair of plates 190b being closed by a narrow horizontal plate 190c (FIG. 6) and the outer edges of each pair of plates 190 being closed by a vertical plate 190d (FIGS. 6 and 9). The bottom edges of each pair of plates 190b is open so that the lower end of each space S is in communication with the bed B of particulate material. The spacing between each pair of plates 190b is maintained by a plurality of studs 190e welded to one or both of the plates 190b of the pair. Passages 190f through each plate 190b provide for gas flow 190g from the interior of the inner tube 190 through the space S between each pair of plates 190b to the particulate bed B.

The plates 190b, and hence the inner tube 190, are suspended from the structure 128, as by brackets 190h.

Radially outward of the inner tube 190 and its perforated plates 190b is an annular outer tube formed from a plurality of axially spaced-apart rings 102a which are concentric about the longitudinal axis of the vessel 118 and which provide gas-flow openings 105a between them. The structure and function of these rings 102a are the same as those of the rings 102 of the embodiment of FIGS. 1–5. The rings 102a, however, are supported from the vessel sidewall 118 by longitudinally-extending webs W disposed radially with respect to the axis of the vessel and welded to the inner surface of the sidewall 118 and to the rings 102a. Each of the webs W has a plurality of gas flow openings 101 therethrough, so as to interconnect the spaces 101a between the webs W with each other and permit the gas to flow from all the spaces 101a to a gas discharge opening 186 in the vessel sidewall 118.

There is thus a central axial gas space formed by the inner tube 190 and by the spaces S (FIG. 9) between plates 190b. Gas flows from the inlet 136 downwardly through the tube 190 and radially outwardly through the passages 190f in the wall of the tube 190 into the spaces S and then laterally through the passages 190f in the plates 190b. Between the annular array of rings 102a and the outer surfaces of the inner tube 190 and of the plates 190b is a generally annular intermediate space through which the bed B of solids moves downwardly. The gas entering the bed B via the passages 190f flows generally horizontally through the bed B as shown by the arrows 190g (FIG. 8) and then through the passages 105a in the outer annular tube which is formed by the rings 102a. An outer generally annular space 101a formed between the vessel sidewall 118 and the rings 102a receives the gas flowing through the passages 105a, following which the gas flows through the opening 101 in the webs W and then to the gas outlet 186.

The gas/solids contactor illustrated in FIGS. 10–17 has primary utility as a reactor for removing nitrogen oxides and surfur oxides from hot flue gas resulting from, for example, the burning of household trash or fossil fuels, especially coal. In this case the particulate solids passing through the contactor react with the unwanted oxide constituents of the gas and may then be regenerated and recycled to the contactor.

Figure 10:
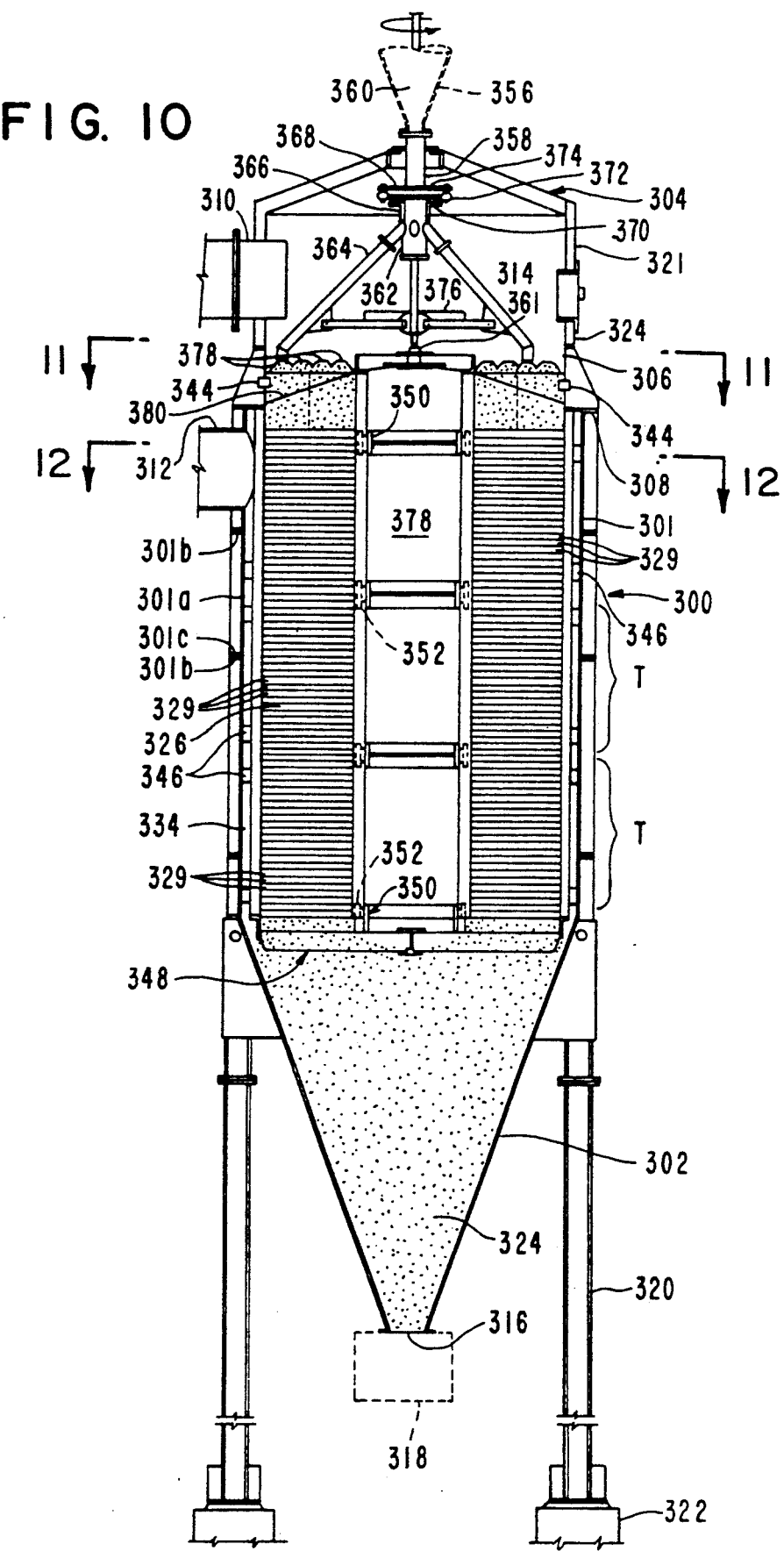
FIG. 10 is a vertical longitudinal sectional view of a third gas/solids contactor.
Figure 11:
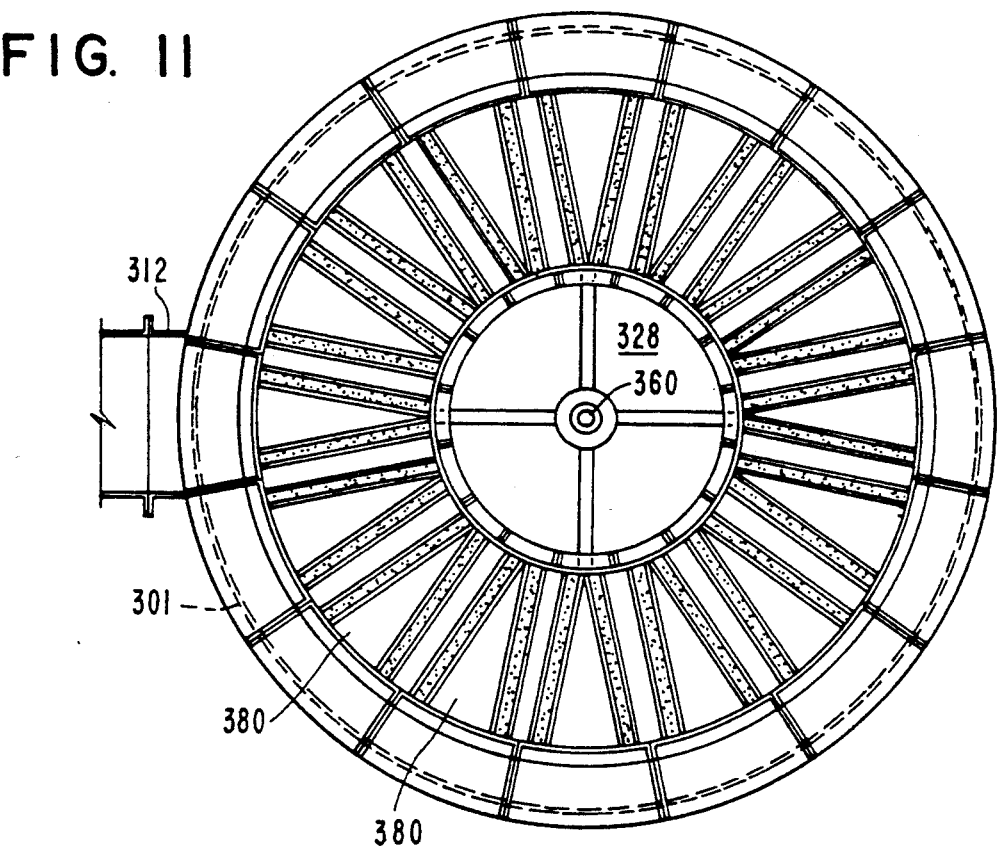
FIGS. 11 and 12 are horizontal sectional views taken on the lines 11—11 and 12—12, respectively, of FIG. 10.

The contactor of FIGS. 10–17, with specific reference to FIG. 10, includes a vertical tank-like vessel 300 having a cylindrical side wall 301, a conical bottom wall 302 and a dome-like upper end wall 304 having a cylindrical sidewall portion 306 connected to and supported by the sidewall 301 as at 308. A flue gas inlet 310 communicates with the interior of the upper end portion of the vessel 300, and a clean gas outlet 312 communicates with the interior of the vessel 300 at a location below the flue gas inlet 310. A particulate solids inlet in the form of a rotary feed-in device 314, described more in detail hereinafter, is provided at the upper end of the vessel 300, and a particulate solids outlet 316 is provided at the lower end of the vessel 300. A solids discharge device 318 communicates with the outlet 316. Support columns 320 connect the vessel 300 to a foundation 322. The exterior of the vessel 300 can be covered with thermal insulation 321.

The vessel sidewall 301 in the illustrated embodiment is constructed of a plurality of vertical hollow cylinders 301a, each having horizontal circumferential flanges 301b and 301c at its upper and lower ends, respectively. By bolting or otherwise connecting the lower flange 301c of one cylinder 301a to the upper flange 301b of another cylinder 301a, a vessel 300 of any desired height can be more easily assembled.

The structure inside the vessel 300 provides a unique form of intimate contact between the flue gas and the particulate solids 324 which move downwardly through the vessel 300. Broadly described, and with reference first to FIG. 12, the solids 324 which enter the vessel 300 flow downwardly through a plurality of solids flow channels 326 while flue gas flows generally horizontally through the downwardly moving solids. The flue gas is directed to the solids flow channels 326 from a central vertical gas flow channel 328 via radially extending gas flow passages 330. After passing generally horizontally through the solids flow channels 326 the gas enters gas spaces 332 from which it flows radially outward into an annular gas space 334 adjacent the vessel sidewall 301 and then to the clean gas outlet 312. The solids 324 pass through the open lower ends of the solids flow channels 326 into the lower portion of the vessel 300 adjacent the conical wall 302, where they form a gas seal, and then through the solids outlet 316 under the influence of the variable-rate feeder 318.

Figure 12:
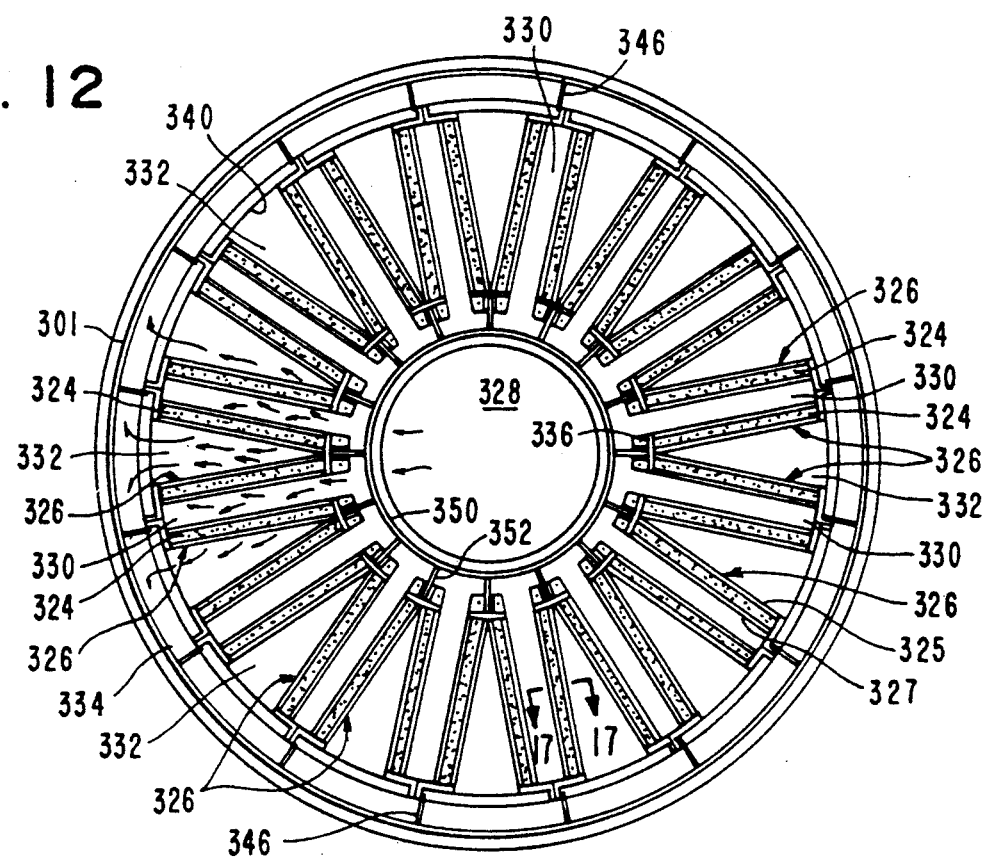

In the illustrated construction there are 32 solids-flow channels 326 arranged in pairs to provide a special gas-flow pattern relative thereto. As seen in FIG. 12 each solids-flow channel 326 is rectangular in horizontal cross-section and is arranged generally radially to the axis of the vessel 300. The side walls 325 and 327 of each channel 326 are constructed of stationary louvers 329 as described more in detail hereinafter.

The members of each pair of channels 326 are arranged in a V pattern, with the radially inner edges of the channels 326 forming the apex of the V. The radially inner edges of each such pair of channels 326 are closed by a common arcuate end wall 336, and the radially outer edges of each such pair are closed by a common arcuate end wall 338. With the pairs of channels 326 being circumferentially spaced apart, as seen in FIG. 12, the gas-flow passages leading radially outwardly from the central gas flow channel 328 lie between adjacent pairs. The space between the members of each pair forms one of the exit gas spaces 332, each space 332 being closed at the apex of the respective V and having a radially outer wall 340. The wall 340 has a plurality of radial holes 342 (FIG. 15) communicating with the common annular gas space 334.

Figure 13:
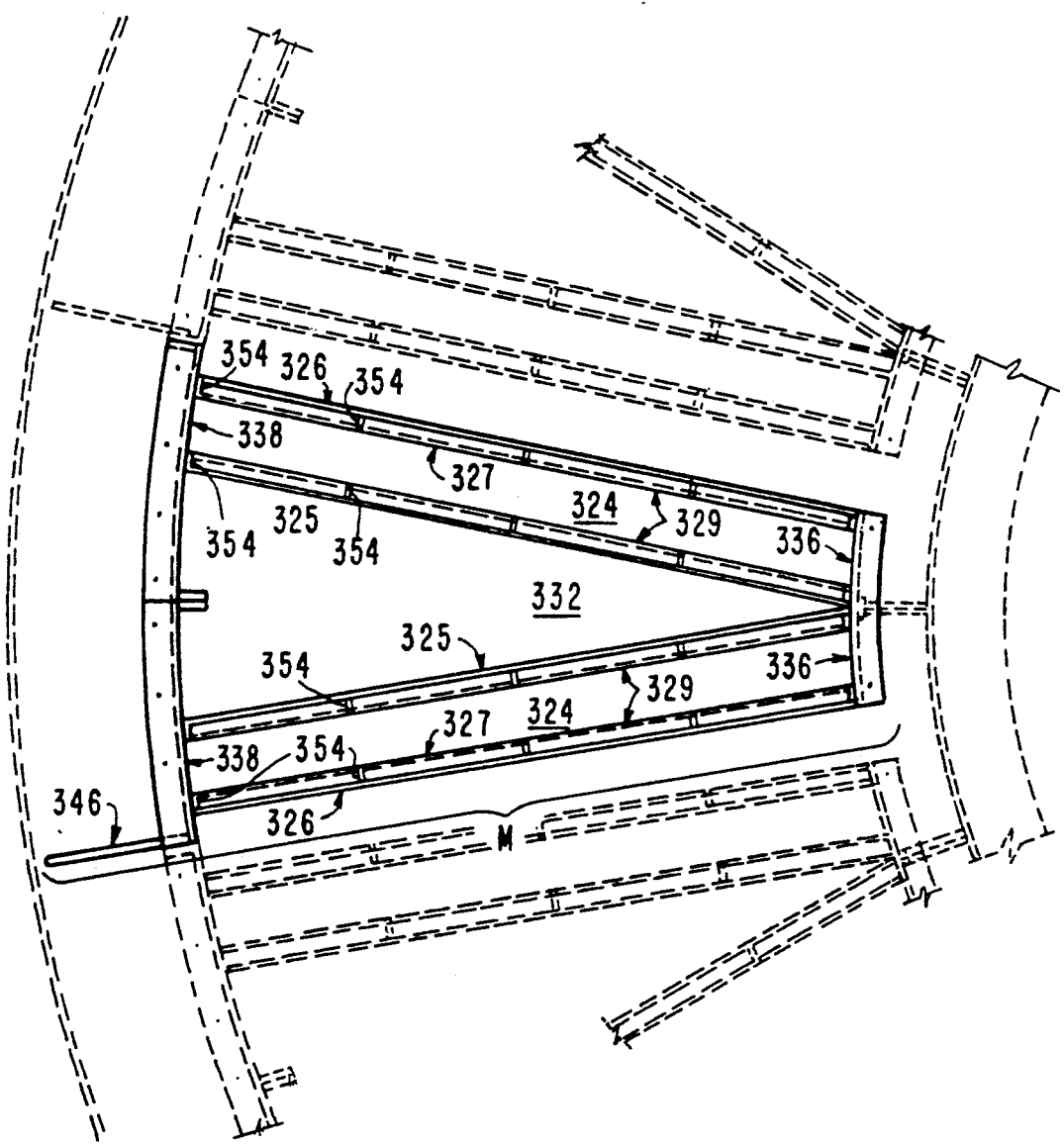
FIG. 13 is a plan view, on an enlarged scale, of a gas/solids module.

Each pair of V-arranged solids-flow channels 326 together with the end walls 336, 338 and 340 can conveniently be constructed as a pie-shaped module M of manageable size, as shown in FIGS. 13 and 14. In the illustrated arrangement sixteen modules M or pairs are connected in a circular patter to form a tier T (FIG. 10). A plurality of tiers T (three, for example, in FIG. 10) can be stacked one on top of another and connected together to provide a bed of solids of a desired vertical length. Analogously, the modules M can be constructed in different sizes to provide a desired tier diameter.

It is important to allow for thermal expansion and contraction of the tiers T in a vertical direction, and to this end the uppermost tier T is connected at its upper end portion to the vessel sidewall, 306, as by bolts 344, so that the entire stack of tiers T is suspended from its upper end. Each tier T carries a plurality of radial, circumferentially spaced-apart spacer plates 346 which slidably engage the inner surface of the vessel sidewall 301, thereby providing lateral stabilization for the stack of tiers while permitting vertical expansion and contraction of the stack. The lower end of the lowermost tier T carries one or more stabilizing beams 348 (FIG. 10) extending across the diameter of the tier T but not connected to the vessel sidewall 301. Additional lateral stabilization of the tiers T is provided by a plurality of axially spaced-apart rings 350 located in the central gas-flow channel 32 and having external flanges 352 bolted to the inner end walls 336 of the modules M.

Figure 17:
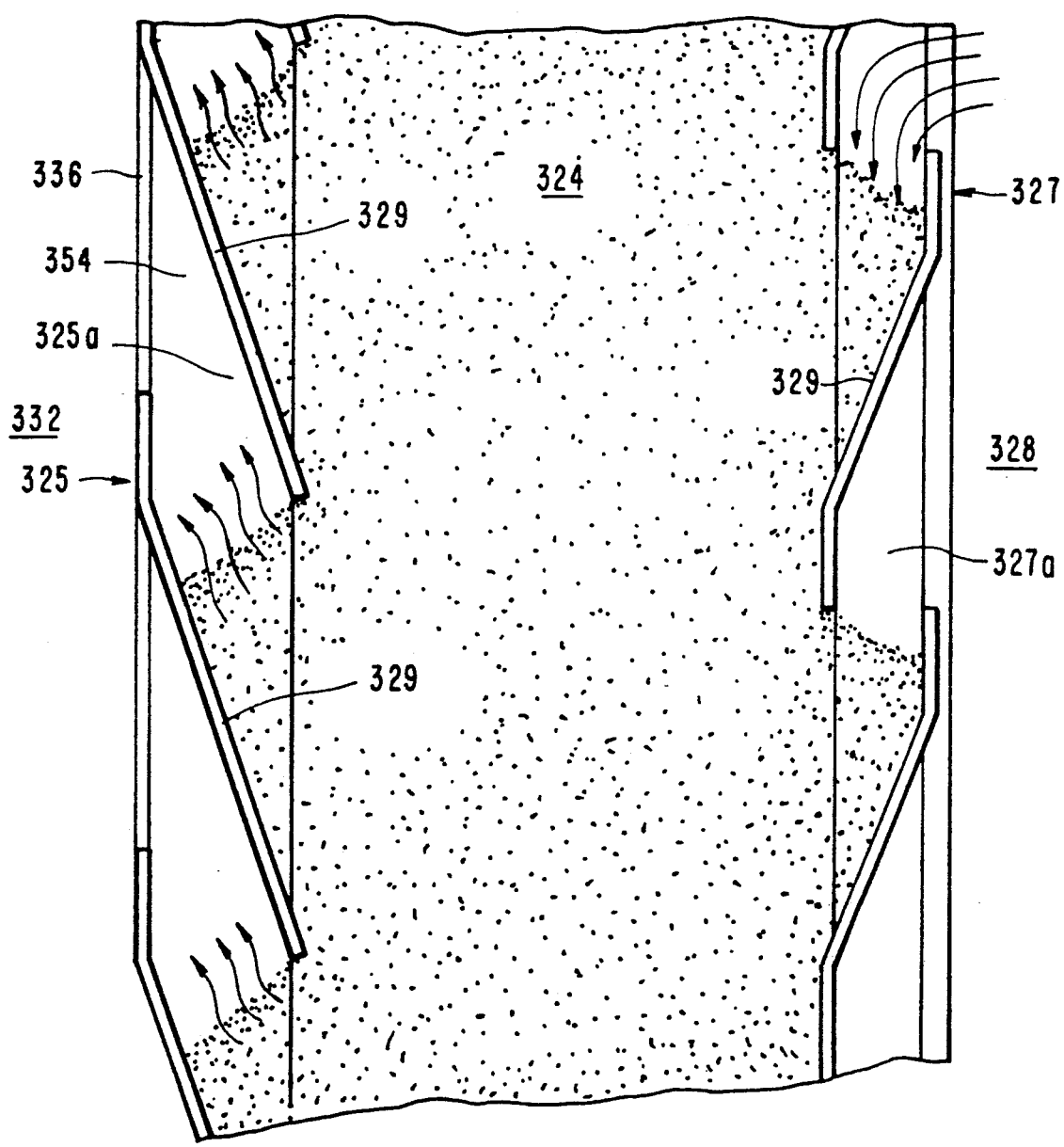
FIG. 17 is a fragmentary sectional view taken on the line 17—17 of FIG. 12.

As stated previously the radially disposed side walls 325 and 327 of each solids-flow channel 326 are formed of vertically spaced-apart louvers 329. This construction, which results in gas passages 325a and 327a between adjacent louvers, is shown in FIG. 17 which is a fragmentary vertical cross-section, on an enlarged scale, of a single channel 326 taken on the line 17—17 of FIG. 10. A vertical sectional view through either of the channels 326 in FIG. 13 would show the same configuration. The louver arrangements are also shown in FIGS. 14, 15 and 16. Each louver 329 may be simply a straight thin plate which is inclined downwardly and inwardly toward the interior of the respective solids-flow channel 326. The louvers of any given channel 326 are supported by having their ends fastened to the respective end walls 336 and 338. Stiffening of the louvers 329 is provided by connecting thin parallelogram-shaped plates 35 between adjacent louvers 329 at spaced apart locations (FIGS. 1 and 17). The angle of inclination of each louver 329 is preferably about 20° from vertical. This inclination provides a frictional gripping force between each louver 329 and the adjacent downwardly moving solids 324 so that mass density of the column of solids at the lower end of a solids-flow channel 326 is not significantly higher than the mass density near the upper end; that is, the column of solids does not compact significantly as a result of its own weight. The inclination of the louvers 329 and the vertical spacing between them prevents the solids 324 from being pushed out through the spaces between adjacent louvers 329.

As shown in FIGS. 13-17 one louvered sidewall 325 of a solids-flow channel 326 is a gas-exit sidewall, in that gas flows out through the passages 325a from the interior of the channel 326 to an exit gas space 332. The other louvered sidewall 327 of the respective channel 326 is a gas-inlet sidewall, in that gas flows into the interior of the channel 326 through the passages 327a. The open area ratio between louvers 329 may be about 30%.

The slope angle of the louvers 329 is also important for causing downward mass flow of the solids; that is, what is first in to a louver 329 is first out. This prevents dead storage area buildup on the louver surfaces and removes the possibility that the passages 327a can becomes plugged with fine particulate matter contained in the gas.

The solids feed-in device 314, shown in FIG. 10, is a gravity-feed, rotating spout device. A stationary surge bin 356 is supported axially above the vessel 300 and is kept sufficiently full of solids to form a gas seal, thereby preventing gas from the gas inlet 310 from flowing upwardly into the bin. Solids flow by gravity from the bin 356 through a stationary vertical pipe 358 into a rotating spout assembly which is driven by a motor-driven rotary shaft 360 extending downwardly through the bin 356 and the pipe 358. The lower end of the shaft 360 is supported in a bearing 361. Solids leaving the lower end of the pipe 358 pass into a further vertical pipe 362 to which four downwardly and outwardly extending spouts 364 are connected. A packing ring 366 surrounds the lower end portion of the stationary pipe 362 and is axially compressed between the upper end of the pipe 362 and the lower end of a collar 368. Compression of the packing 366 is effected by an upward force on the pipe 362, this being achieved by fixing a collar 370 to the pipe 362 and drawing it toward the collar 368 with bolts. The outer edge of the collar 368 engages rotatable centering wheels 372 which are carried by a plate 374 fixed to the pipe 358. The rotary shaft 360 is connected to the spouts 364 by arms 376.

In operation of the feed-in device 314 the elements 360, 362, 364, 368 and 370 rotate, with the result that solids flow from the bin 356 to the spouts 364 and are discharged from the lower ends of the latter to the open upper ends of the solids-flow channels 326. The radial reach of the spouts 364 is different so that solids are deposited uniformly along the radial dimension of each channel. Four mounds 378 of solids formed by the four spouts 364 are shown in FIG. 10. The solids do not enter the upper ends of the gas exit spaces 332 because the upper ends of these spaces are closed by tent-like inclined plates 380 (FIGS. 10 and 11) which guide the solids to adjacent solids-flow channels 326. The plates 380 can be highly polished to prevent buildup of solids and they need not be gas proof so long as they do not permit solids to enter the gas exit spaces 332.

The operation of the contactor of FIGS. 10-17 has been described above in conjunction with the description of the various mechanical elements. In summary it may be said that sequence of solids flow is through the rotary in-feed device 314 to the upper ends of the solids-flow channels 326, downwardly through the latter but not laterally through the spaces between lowers 329, into the lower conical end of the vessel 300 and finally through the solids outlet 316 under the influence of the solids discharge device 318. The sequence of gas flow is through the gas inlet 310 and then downwardly through the central gas flow channel 328 and simultaneously into the radial gas flow passages 330. From the passages 330 the gas flows through the openings 327a (FIG. 17) into the interior of the solids-flow channels 326, then generally horizontally through the solids 324 in the channels 326 and then out through the openings 325a (FIG. 17) into the gas-exit spaces 332. From the gas-exit spaces 332 the gas flows through openings 342 (FIG. 15) into the annular gas space 334 (FIGS. 10 and 12) and then to the gas outlet 312.

If the solid sorbent material 324 is one which can be regenerated by reaction with a gas which removes the sulfur and/or nitrogen oxides fromt he material 324, the contactor of FIGS. 10-17 may be used as a regenerator for the material 324. The height and diameter of the contactor can be based on any power plant application: power plant size, flue gas flow, flue gas temperature, flue gas pressure and the concentration of sulfur oxides and nitrogen oxides in the flue gas. The performance of a given design can be tested in a prototype to determine oxide removal, particle size removal, sorbent flow rate, sorbent residence time, empty bed superficial velocity, gas/solid contact time, bed thickness and overall gas pressure drop in total unobstructed bed volume.

What is claimed is:

1. A gas-particulate solid contact apparatus for contacting a gas with a replenished, downwardly-moving bed of particulate material, for affecting the gas, comprising:

wall means defining an upright tower having a cylindrical sidewall, a top end wall and a bottom end wall collectively enclosing a space;
 pipe means defining a gas inlet through said top end wall means to an upper, axially centrally located part of said space;
 pipe means defining a gas outlet through said cylindrical sidewall means from a radially outer part of said space;
 a vertical inner tube disposed axially in said space, said inner tube having a plurality of openings radially therethrough and having an open lower end spaced above said bottom end wall of said tower;
 a vertical outer tube concentric with and surrounding said inner tube, the lower end of said outer tube being open and spaced above said bottom end wall of said tower, the upper end portion of said outer tube being imperforate and extending through said upper end wall of said tower and connected thereto for support, the portion of said outer tube below said imperforate portion being formed by a plurality of axially spaced-apart, downwardly tapered rings which are concentric with said imperforate portion and which define between them circumferential passageways, said rings being supported by a plurality of radially extending longitudinal webs having outer edges connected to said rings and having inner edges connected to said inner tube and supporting the latter;
 a central space portion defined by said inner tube and in communication with said gas inlet pipe means, an annular intermediate space portion radially between said inner tube and said outer tube, and an outer annular space portion radially between said outer tube and said cylindrical sidewall and in communication with said gas outlet pipe means;
 said central, intermediate and outer space portions communicating at their lower ends with a common space portion in the lower end of said tower;
 pipe means defining a solids inlet for particulate bed solids through said top end wall means into an upper end of said intermediate space portion;
 pie means defining a solids outlet for particulate bed solids through said wall means from said common space portion at a lower end of said tower; and
 a particulate-solids feeding device in communication with said common space portion for controllably feeding particulate material from said common space portion to said pipe means defining a solids outlet, whereby, by controlling the rate of introduction of solids into said intermediate space through said pipe means defining a solids inlet and controlling said feeding device, a replenished, downwardly moving annular bed of particulate solids may be established and maintained in said intermediate space portion with a lower end of said annular bed being defined by said common space between lower ends of said inner and outer tubes and said feeding device, through which gas introduced to said central space through said pipe means defining a gas inlet must pass in order to emerge from said outer space through said pipe means defining a gas outlet.

2. The apparatus of claim 1, wherein said inner tube downwardly tapered, whereby said intermediate space is a cone.

3. A gas/solids contact apparatus for contacting a gas with a replenished, downwardly-moving bed of particulate solid material comprising:

walls means defining an upright tower having a cylindrical sidewall, a top end wall and a bottom end wall collectively enclosing a space;

pipe means defining a gas inlet through said top end wall means to an upper, axially centrally located part of said space;

pipe means defining a gas outlet through said cylindrical sidewall means from a radially outer part of said space;

a vertical inner tube disposed axially in said space, said inner tube having a plurality of gas-flow openings radially therethrough and arranged in vertical rows, and said tube having an open lower end spaced above said bottom end wall of said tower;

a plurality of hollow, radially disposed, longitudinal webs arranged outside said inner tube and connected thereto so that said openings in said inner tube communicate directly with the interior of said hollow webs, each of said webs having a plurality of gas-flow openings therethrough;

a vertical outer tube concentric with and surrounding said inner tube and said webs, the lower end of said tube being open and spaced above said bottom wall of said tower, said outer tube comprising a plurality of axially spaced-apart, downwardly tapered rings which define between them circumferential gas-flow passageways, said rings being supported by a plurality of radially-extending, longitudinal perforated webs having inner edges connected to said rings and outer edges connected to said cylindrical sidewall;

a central space defined by said inner tube and in communication with said gas inlet pipe means, a generally annular intermediate space portion radially between said inner tube and said outer tube, and a generally annular outer space portion radially between said outer tue and said cylindrical sidewall and in communication with said gas outlet pipe means; said central, intermediate and outer space portions communicating at their lower ends with a common space portion in the lower end of said tower;

pipe means defining an inlet for particulate bed solids through said top end wall means into an upper end of said intermediate space portion;

pipe means defining an outlet for particulate bed solids through said bottom end wall means from said common space portion; and a particulate-solids feeding device in communication with said common space portion for controllably feeding particulate material from said common space portion to said pipe means defining a particulate bed outlet, whereby, by controlling the rate of solids into said intermediate space through said pipe means defining a solids inlet and controlling said solids feeding device, a replenished downward moving bed of particulate solids may be established and maintained in said intermediate space portion with a lower end between the lower ends of said inner and outer tubes and said feed, through which gas introduced to said central space through said pipe means defining a gas inlet must pass in order to emerge from said outer space through said pipe means defining a gas outlet.

4. Gas/solids contact apparatus comprising a vertical cylindrical vessel having a gas inlet near its upper end, a gas outlet below said inlet, a particulate-solids in-feed device for feeding particulate solids through a solids inlet to the interior of the upper end of said vessel and a particulate-solids out-feed device for discharging particulate solids from a solids outlet at the lower end of said vessel; means defining a central, vertical gas-flow channel with said vessel, said central channel having an open upper end for receiving gas from said gas inlet and having an open lower end located above said solids outlet; means forming a plurality of horizontally spaced-apart, vertical particulate-solids-flow channels which have open upper ends in communication with said solids inlet and which have open lower ends located in the lower portion of said vessel above and in communication with said solids outlet, said solids-flow channels extending radially from said central gas-flow channel and being arranged circumferentially around said central gas-flow channel, each of said solids-flow channels having a perforated gas-inlet sidewall extending the vertical length of the channel and an opposite perforated gas-outlet sidewall extending the vertical length of the channel; first gas-flow directing means placing all of gas-inlet side walls of said solids-flow channels in communication with said central gas-flow channel; said gas-flow directing means forming an annular gas space surrounding said solids-flow channels and placing all of said gas-outlet side walls of said solids-flow channels in communication with said annular gas space, said gas outlet of said vessel being in communication with said annular gas space, wherein adjacent pairs of said solids-flow channels and said gas flow-directing means are arranged so that the two gas-inlet side walls of a given pair form a common gas-flow passage in communication with said central gas-flow channel and so that the two gas-outlet side walls of a given pair form a common gas-flow passage in communication with said annular gas space.

5. Apparatus as in claim 4 wherein each of said solids-flow channels is rectangular in horizontal cross section, the two long sides of the rectangle when viewed in horizontal cross section being generally radially with respect to the axis of said vessel and constituting, respectively, said gas-inlet sidewall and said gas-outlet sidewall, both said side walls being formed of vertically spaced-apart overlapping horizontal louvers, the ends of said louvers being connected to and supported by end walls, said end walls defining the short sides of said rectangle.

6. Gas/solids contact apparatus comprising a vertical vessel having a circumferential sidewall, a gas inlet for flowing gas into the interior of the upper end of said vessel, a gas outlet below said gas inlet, a particulate-solids in-feed device for feeding particulate solids through a solids inlet to the interior of the upper portion of said vessel, and a particulate-solids out-feed device for discharging particulate solids from a solids outlet at the lower portion of said vessel; a plurality of vertical particulate-solids-flow channels arranged in a generally circular pattern about the vertical axis of said vessel, each of said solids-flow channels having an open upper end in communication with said solids inlet for receiving solids therefrom and an open lower end located in the lower portion so said vessel and above and in communication with said solids outlet, each of said solids-flow channels being defined in part by a vertical gas-inlet side wall and opposite vertical gas-outlet side wall, said side walls being arranged generally radially with respect to the axis of said vessel and said solids-flow channels being formed in part by inner and outer end walls closing the inner and outer edges of said side walls, each of said side walls being formed by a plurality of horizontal, vertically spaced-apart louvers having opposite ends connected to said inner and outer end walls whereby said louvers are supported by said end walls, means including said inner end walls forming a vertical central gas-flow channel having generally radial gas-flow passages leading to said gas-inlet side walls; means including said outer end walls and said vessel circumferential sidewall forming a vertical generally annular gas space common to and surrounding all said solids-flow channels and in communication with the gas-outlet sidewall of each of said solids-flow channels; and means suspending the inner and outer side walls of all said solids-flow channels form said vessel circumferential side wall at a location in the upper portion of said vessel.

* * * * *